United States Patent [19]

Nicholas

[11] Patent Number: 5,044,470
[45] Date of Patent: Sep. 3, 1991

[54] LUBRICANT PUNCTURE DEVICE AND METHOD

[75] Inventor: Paul Nicholas, Burbank, Calif.

[73] Assignee: Lubricating Specialties Company, Pico Rivera, Calif.

[21] Appl. No.: 572,180

[22] Filed: Aug. 23, 1990

[51] Int. Cl.⁵ ............................................. F16N 21/00
[52] U.S. Cl. ................. 184/105.1; 184/38.1; 141/329
[58] Field of Search .............. 184/1.5, 28, 38.1, 105.1, 184/105.3; 141/329, 330; 56/12.3

[56] References Cited

U.S. PATENT DOCUMENTS

| | | | |
|---|---|---|---|
| 2,939,381 | 6/1960 | McBride | 141/329 |
| 3,665,981 | 5/1972 | Trebbien | 141/329 |
| 3,788,519 | 1/1974 | Mengel | 141/329 |
| 4,269,237 | 5/1981 | Berger | 141/330 |
| 4,721,137 | 1/1988 | Müller | 141/330 |
| 4,787,827 | 11/1988 | Hinkle et al. | 184/105.1 |
| 4,865,156 | 9/1989 | Poling | 184/1.5 |

Primary Examiner—Ira S. Lazarus
Assistant Examiner—Alan B. Cariaso
Attorney, Agent, or Firm—Blakely, Sokoloff Taylor, Zafman

[57] ABSTRACT

A lubricant connecting apparatus is disclosed for supplying lubricant from a lubricant reservoir to a distribution pump in the spindle lubrication system of a cotton harvester. The apparatus uses a piercing means to puncture and penetrate a lubricant reservoir, and has a connecting means to provide fluid communication between the lubricant reservoir and the distribution pump.

4 Claims, 3 Drawing Sheets

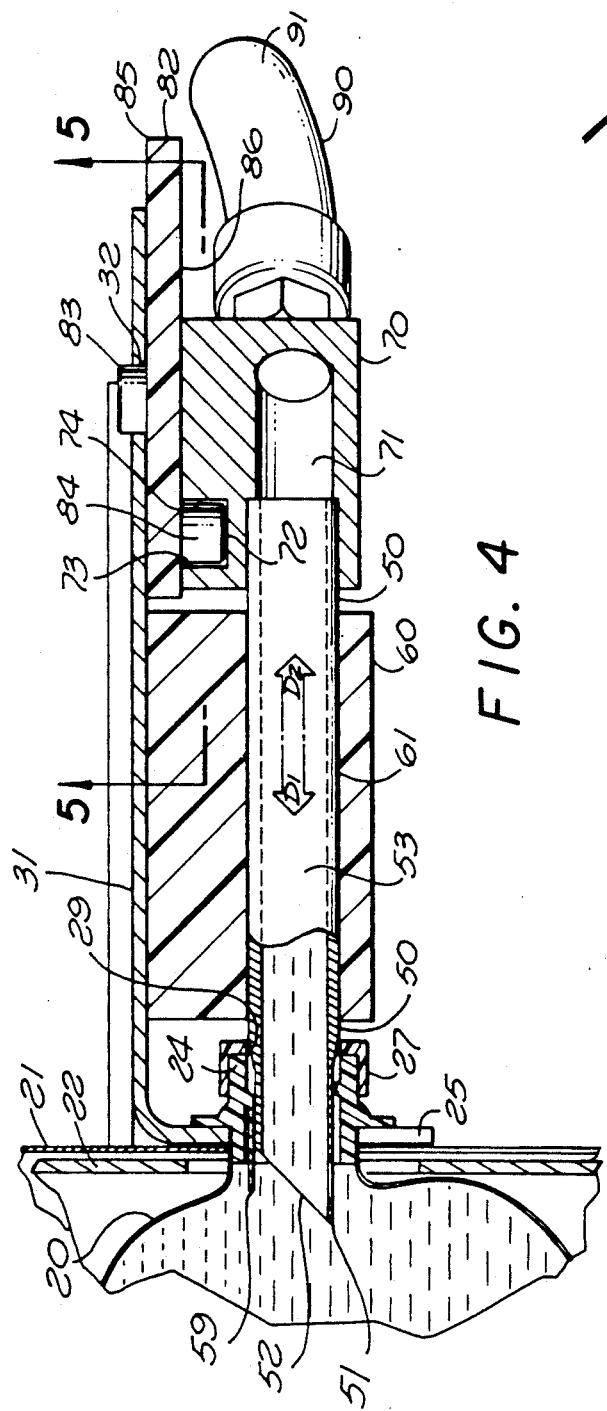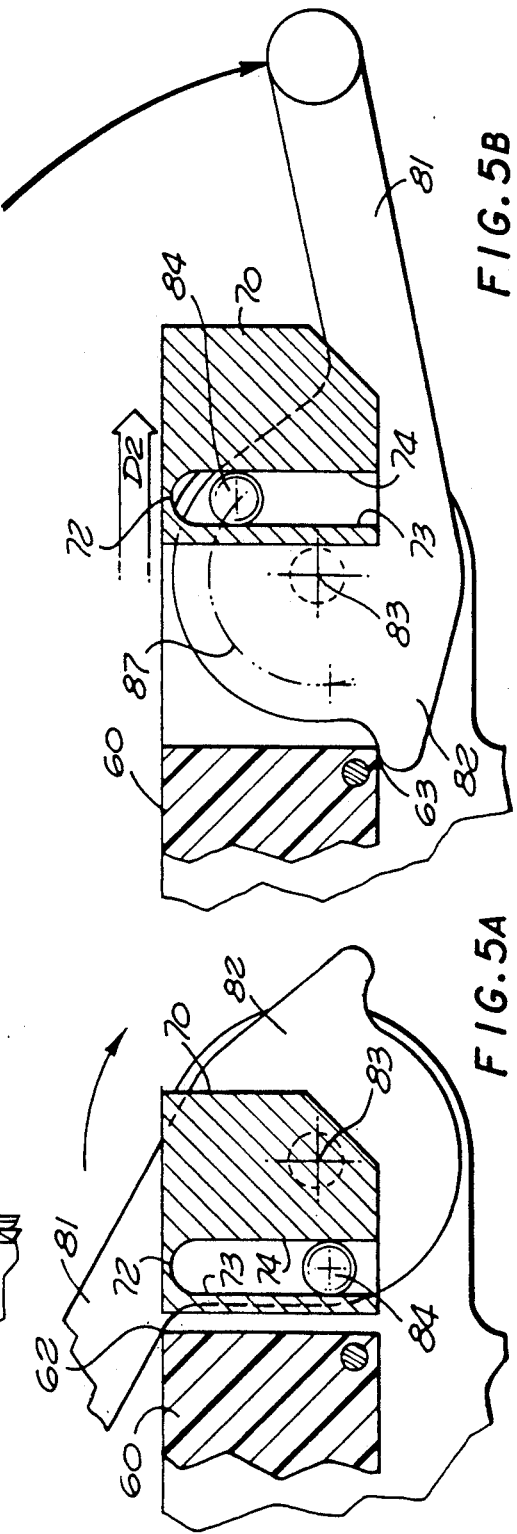

LUBRICANT PUNCTURE DEVICE AND METHOD

BACKGROUND OF THE INVENTION

1. Field of the Invention

This invention relates to cotton picker apparatus and more particularly, to an apparatus for quickly, securely and efficiently connecting and disconnecting a lubricant reservorr to a lubrication distribution pump of a cotton picker spindle lubrication system.

2. Art Background

Cotton, the vegetable fiber produced by shrubs and small trees of the genus Gossypium, has been cultivated and utilized for at least five thousand years and still constitutes one of the leading cash crops of United States agriculture. Successful cultivation of cotton requires a long growing season with abundant sunshine and water during the period of growth and dry weather when the cotton is ready for harvest. It is critical to the harvest that it be completed in as short a period as possible, no longer than eighteen to twenty days. If harvesting is delayed beyond that period, the cotton will discolor making it commercially undesirable, and some cotton will simply blow away. Rain creates additional risk to the quality of the cotton and the effectiveness of the harvest, so that the longer the harvest proceeds the greater the risk it will rain during the harvest. Thus efficient utilization of time is extremely important, and any method of reducing "down time" of the cotton harvest apparatus will greatly improve the success of, and the yield from, the harvest.

One of the necessary tasks which heretofore has taken considerable time during the cotton harvest is the lubrication of the harvesting machines, known as cotton pickers. Cotton pickers are self-propelled and utilize rows of spindles to pick and process the cotton. The spindles are mounted upon moving bars and rotate at speeds up to 4000 rpm. The spindles and associated gears and bearings are lubricated by a thin (NLGI Grade 00) grease known simply as cotton-picker grease, which is introduced into the bars through a series of lubricating ports. Approximately thirty to forty pounds of grease are required to fill a cotton picker spindle system on a two row cotton picker harvester.

Heretofore, the application and replenishment of cotton picker spindle grease has consumed a significant amount of lost production time or down time which is critical during the harvest period. Industry practice is to refill the spindle bars after each ten hours of operation. This refilling operation must be performed while the machinery is already warm and cannot be done prior to beginning the harvesting in the morning, inasmuch as the grease will not flow properly through the system until the machinery is warm. The conventional practice, therefore, has been to send a maintenance vehicle with grease applicators to meet and lubricate the cotton picker somewhere in the fields during the harvesting operation. The refilling operation done in this way normally takes from forty-five minutes to an hour, during which time the cotton picker is idle and unable to harvest. It also requires the use of a separate maintenance vehicle to meet the cotton picker and provide the requisite grease.

The use of continuous grease applicators such as are customarily employed on large trucks and continuously operating machinery has not generally been successful when applied to cotton pickers. The consumption of cotton picking grease during harvest does not occur at a uniform rate, and heretofore continuous application systems have not been found that could supply the required amount of grease in all parts of the system.

In one recent prior art device incorporates a bulk reservoir mounted on the machine. Grease is pumped into the reservoir and periodically added to the system by a belt-driven pump with an electric clutch. This approach has the obvious disadvantage that the reservoir itself must be periodically filled, a time-consuming and labor intensive operation. The reservoir is mounted near the cotton basket at the top of the machines and since cotton dust can be ignited by a spark, basket fires are not unusual. Of course, the proximity of the large quantity of grease can increase the severity of the fire. Thus, this system has not been able to solve the problems of cotton-picker lubrication.

U.S. Pat. No. 4,769,978 discloses a lubrication distribution system for a cotton picker machine in which a reservoir of grease is disposed on-board a cotton picker. This system appears to require tools to connect the reservoir to the lubrication system. The use of tools and a complex interconnection system has the disadvantage of requiring a substantial amount of time to complete the lubrication process.

In a co-pending patent application of the common assignee hereof, a process and apparatus for lubricating the spindle bars of a cotton picker utilizing a disposable lubricating reservoir that is attached using standard plumbing fittings and tools is disclosed. This lubrication system saves considerable time and effort over prior art systems. The present invention is directed toward further increasing the efficiency of the system by providing an efficient apparatus and method of connecting disposable lubricant containers to the inlet of the lubricant distribution pump.

SUMMARY OF THE INVENTION

The present invention comprises a lubricant reservoir connecting apparatus for connecting and providing fluid communication between a lubricant reservoir and a distribution pump for the spindle lubrication system of a cotton harvester. The apparatus comprises a piercing means to puncture and penetrate the lubricant reservoir and a connector means to connect the lubricant reservoir to the distribution pump. The piercing means is actuated by a lever arm which connects and disconnects the reservoir and pump. The piercing means is specially adapted to puncture a membrane in the lubricant reservoir and a bracket means is provided to securely hold the membrane during the piercing thereof.

It is an object of my invention to provide an apparatus for connecting and disconnecting lubricant containers to a pump of a spindle lubrication system of a cotton picker so that the replacement of expended lubricant reservoirs with filled reservoirs can be performed in minimal time and with minimal effort.

It is another object of the present invention to provide a connecting apparatus having a piercing means for penetrating a membrane or other pre-defined location in a lubricant container, which can also retract to allow easy replacement of container, and which provides a secure inlet connection from the container to a conduit means which provides fluid communication between the container and a pump means that pumps the grease to lubrication points in the spindle bar system of the cotton picker.

The present invention makes use of a disposable container of grease adapted for use in connection with the subject apparatus. The disposable container comprises preferably a cardboard box with a plastic liner, said liner being filled with sufficient grease to perform a complete lubrication (about 35 pounds) of the cotton picker spindle bar assembly.

BRIEF DESCRIPTION OF THE DRAWINGS

FIG. 4 is a sectional view of the present invention taken through lines 4—4 of FIG. 5.

FIG. 5A is a front view of the portion of the lubricant connecting apparatus taken through lines 5—5 of FIG. 4 showing the handle thereof in a first position.

FIG. 5B is a front view of the portion of the lubricant connecting apparatus taken through lines 5—5 of FIG. 4 showing the handle thereof in a second position.

DETAILED DESCRIPTION OF THE PREFERRED EMBODIMENT

Figure 1:
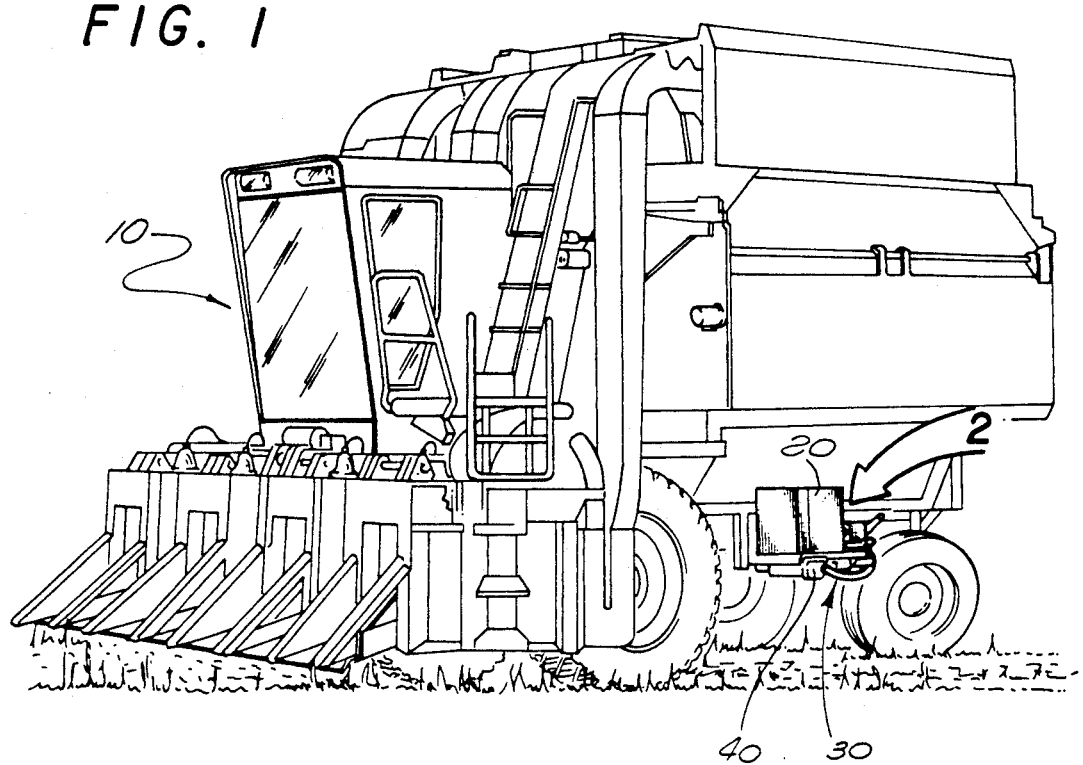
FIG. 1 is a perspective view of a cotton picker comprising the present invention connecting apparatus disposed in its preferred location.

The present invention will now be described with reference to the drawings appended hereto. FIG. 1 shows a cotton picker or cotton harvesting machine generally referred to as 10. Shown on the side of the cotton picker 10, is the preferred location of the present invention.

Grease flows from lubricant container 20 through the connecting apparatus 30 of the present invention and into the inlet of distribution pump 40, which distributes the grease to lubrication points in the spindle bar system of a movable cotton picker. It will be appreciated by a person of ordinary skill in the art that the use of one, two or a plurality of grease containers is a matter of design choice. The lubricant container is preferably a disposable container as described in the copending patent application of the assignee hereof.

Figure 2:
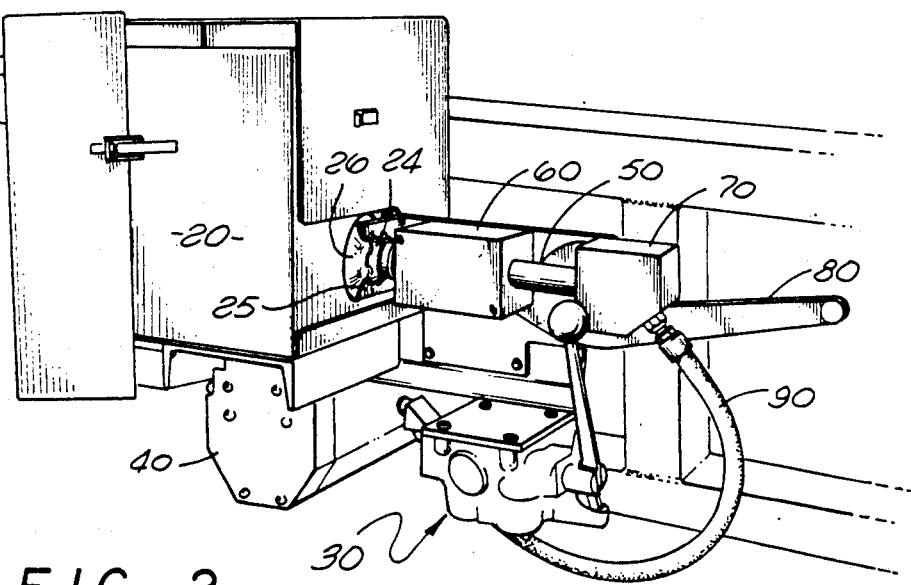
FIG. 2 is a perspective view of the present invention disposed on a cotton picker as indicated by the arrow 2 shown in FIG. 1.

FIG. 2 is an enlarged view of a portion of the cotton picker of FIG. 1 and specifically the lubricant connecting apparatus of the present invention. The connecting apparatus consists of piercing means 50, stationary guide block 60, sliding cavity block 70, actuating lever 80 and conduit means 90.

Figure 3:
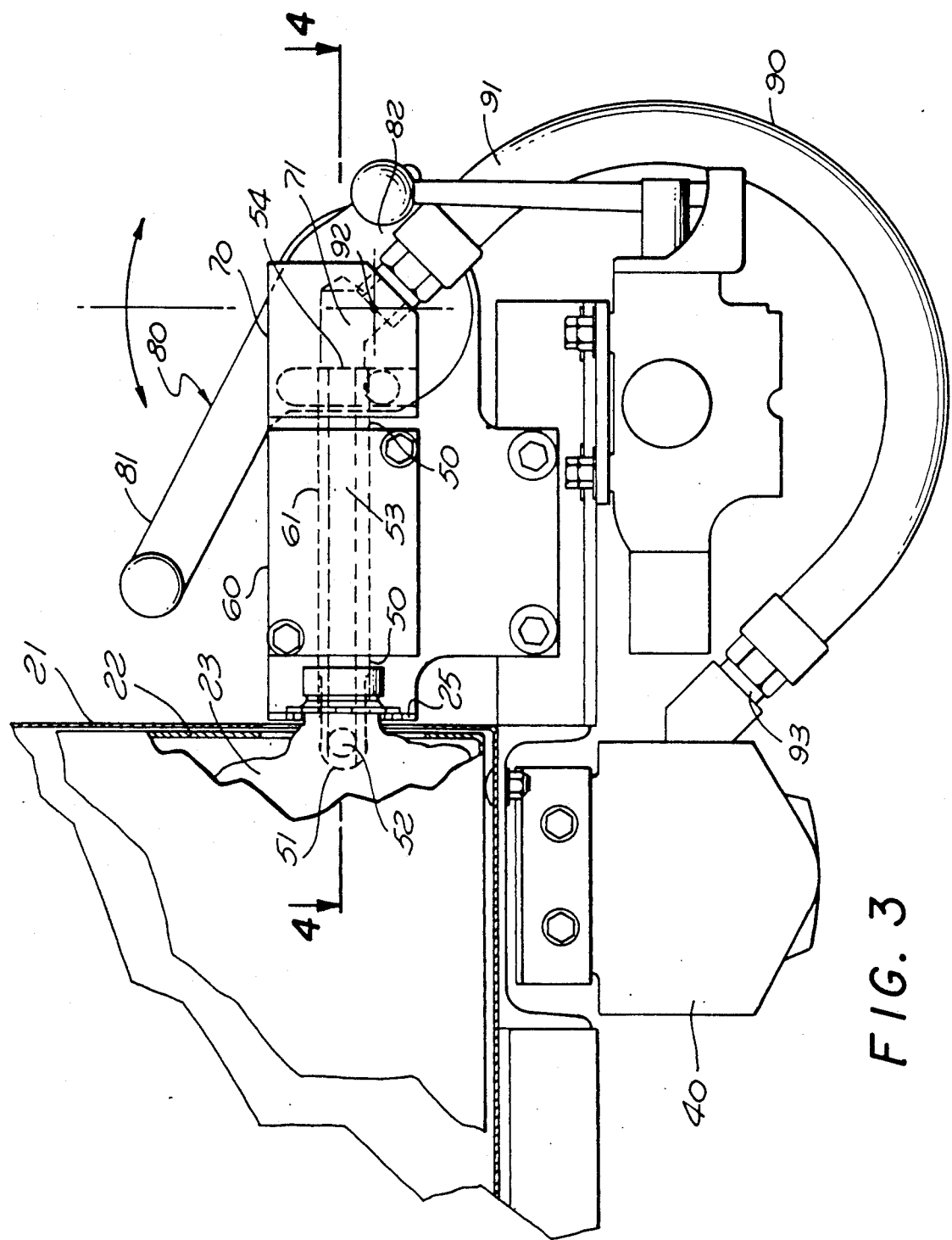
FIG. 3 is a front view of the present invention.

FIG. 3 shows a cross sectional view of the component parts of connecting apparatus 30. Piercing means 50 is fixed at one end to sliding cavity block 70, and is supported by and extends through bore 61 of the stationary guide block 60. At the other end of piercing means 50 is beveled edge 51 which pierces the lubricant container as explained below. Also provided is opening 52 in the end of the piercing means 50 to provide liquid communication with lubricant in the lubricant container 20. Piercing means 50 provides conduit means 53 that has opening 54 at the end attached to the sliding cavity block 70. Tubing 90 is connected at one end to sliding cavity block 70 and at the other end to the inlet of distribution pump 40. Tubing 90 has an opening 92 where it is attached to sliding cavity block 70 and opening 93 where it is attached to distribution pump 40. Sliding cavity block 70 has cavity 71 which provides fluid communication between conduit means 53 and tubing 90. Thus, one continuous fluid conduit is formed in the invented lubricant connecting apparatus, through which lubricant may flow from container 20 through opening 52 into conduit 53, through conduit 53 into cavity 71, through cavity 71 into tubing 90, and from tubing 90 through opening 93 into inlet of pump 40.

Actuating lever 80 consists of lever arm 81 and lever base 82. Also shown in FIG. 3 is lubricant container 20 which is retained in enclosure 21 and is designed for easy access for insertion and removal of the lubricant container. The lubricant container 20 is comprised of a plastic, lubricant resistant material 23 disposed within a cardboard box 22 so that the entire lubricant container is disposable after use. As shown in FIGS. 2 and 3, a lip 24 is provided and in use is disposed in front of retaining means 25 so that during the puncturing of the membrane, the motion of piercing means 50 in direction D1 does not force the lip inside the lubricant container, but instead, holds it in place. The retaining means 25 has a slot 26 to allow the lip 24 to be properly inserted in the retaining means.

FIG. 4 shows a cross sectional view of connecting apparatus 30. The lip 24 of the lubricant container 24 having flange 28 extending radially outward to engage retaining means 25 is shown. Also shown is sealing means 27 which is adapted to fit around lip 24 to create a tight seal between the connecting apparatus 30 and the lubricant container 20. Also as shown, the piercing means is outwardly tapered at 29 so that piercing means fits tightly within the lip 24 while the edge 51, which has a smaller exterior diameter fits easily within the lip 24. The arrows D1 and D2 indicate the direction of movement of the piercing means 50 during insertion and retraction, respectively, of the piercing means 50 in the lubricant container 20. Flap 59 formed by the piercing of the membrane of the lubricant container 20 by beveled edge 51 is also shown.

Also as shown in FIG. 4 connecting pin 83 is located at the center of lever base 82 and extends perpendicularly from lever surface 85 through hole 32 of apparatus supporting member 31 to allow rotation of connecting pin 83. Lever drive rod 84 is located near the edge of lever base 82 and extends perpendicularly from the lever surface 86 and into slot 72 of sliding block 70. Slot 72 has side walls 73 and 74.

FIGS. 3 and 4 show the lubricant connecting apparatus penetrating and accessing lubricant container 20. In the penetrating position lever arm 81 points towards container 20, thereby acting as an indicator, and only a small gap exists between sliding cavity block 70 and stationary block 60.

FIG. 5A shows the position of lever drive rod 84 in slot 72, and the relative positions of stationary drive block 60 and sliding block 70 in the penetrating position shown in FIGS. 3 and 4. In the penetrating position, lever arm 81 rests on edge 62 of stationary block 60. By rotating lever arm 81 away from container 20, lever base 82 rotates on connecting pin 83, causing lever drive rod 84 to make contact with side wall 74 of slot 72.

As shown in FIG. 5B, as lever base 82 rotates, lever drive rod 84 moves in an arc path 87, pushing on side wall 74 and thereby moving sliding cavity block 70 away from container 20 and stationary guide block 60, in direction D2. Piercing means 50, being fixed at one end to sliding cavity block 70, also moves away from container 20, disengaging from container 20 as it slides through bore 61 of stationary guide block 60. This "disengaged" position allows the easy and efficient replacement of a spent container with a filled container. In the "disengaged" position, lever base 82 rests against edge 63 of stationary guide block 60.

FIG. 2 shows the lubricant connecting apparatus "disengaged" from container 20, as evidenced by lever arm 81 pointing away from container 20, and the large gap between sliding block 70 and stationary guide block 60. By rotating lever arm 81 toward lubricant container 20, lever rod 84 pushes on side wall 73 of slot 72, thereby causing sliding cavity block 70 and piercing means 50 to move toward container 20. As piercing means 50 moves toward container 20, beveled edge 51 punctures and penetrates container 20, thereby reestablishing fluid communication between container 20 and pump 40.

Numerous modifications and additions can be made to the process of my invention without departing from the spirit and scope thereof. The above example is by way of illustration and is not meant to be limiting within the scope of the following claims.

What is claimed is:

1. An apparatus that punctures a lubricant reservoir, the lubricant reservoir having a flexible wall that defines an inner cavity which contains lubricant, comprising:
   a rod adapted to penetrate the flexible wall of the lubricant reservoir, said rod having a first bore adapted to allow the lubricant to flow through said first bore;
   actuation means operatively connected to said rod to move said rod between a first position and a second position, wherein said rod is external to the lubricant reservoir in said first position and extending into the inner cavity of the lubricant reservoir in said second position such that the lubricant can flow through said first bore; and,
   a support plate adjacent the flexible wall of the lubricant reservoir, said support plate having a hole;
   a sealing housing that has a second bore adapted to allow said rod to move from said first position to said second position, said sealing housing having a lip extending through said support plate hole and adapted to engage the flexible wall when said rod is in said second position, said sealing housing further having a flange adapted to engage said support plate to limit movement of said sealing housing when said rod moves from said first position to said second position.

2. The apparatus as recited in claim 1, wherein said rod has a tapered surface adapted to engage said sealing housing and prevent the lubricant from flowing out of said second bore.

3. The apparatus as recited in claim 2, wherein said actuation means comprises;
   a first block with a third bore that allows said rod to move within said first block;
   a second block attached to said rod and adapted to move relative to said first block, said second block having a linear groove; and,
   a cam lever pivotally connected to a first pin, said cam lever having a second pin that slides within said groove of said second block such that when said cam lever is rotated about said first pin, said second pin rotates and slides within said groove moving said second block and said rod between said first position and said second position.

4. An apparatus that punctures a lubricant reservoir having a flexible wall that defines an inner cavity which contains lubricant, the lubricant reservoir supplying lubricant to a pump that pumps the lubricant to a spindle lubrication system of a cotton harvester, comprising:
   a rod adapted to penetrate the flexible wall of the lubricant reservoir, said rod having a tapered surface and a first bore adapted to allow the lubricant to flow through said first bore;
   a first block with a second bore that allows said rod to move within said first block;
   a second block attached to said rod and adapted to move relative to said first block, said second block having a linear groove and an inner chamber that is in fluid communication with said first bore;
   a cam lever pivotally connected to a first pin, said cam lever having a second pin that slides within said groove of said second block such that when said cam lever is rotated about said first pin, said second pin rotates and slides within said groove moving said second block and said rod between a first position and a second position;
   a support plate adjacent the flexible wall of the lubricant reservoir, said support plate having a hole; and,
   a sealing housing that has a third bore adapted to allow said rod to move from said first position to said second position and to engage said tapered surface of said rod so that the lubricant does not flow out of said third bore, said sealing housing having a lip extending through said support plate hole and adapted to engage the flexible wall when said rod is in said second position, said sealing housing further having a flange adapted to engage said support plate to limit movement of said sealing housing when said rod moves from said first position to said second positions.

* * * * *